US012358318B2

(12) United States Patent
Paredis et al.

(10) Patent No.: US 12,358,318 B2
(45) Date of Patent: Jul. 15, 2025

(54) UTILITY HOLDER FOR A METAL WHITEBOARD

(71) Applicant: POLYVISION, naamloze vennootschap, Genk (BE)

(72) Inventors: Mathijs Paredis, Opglabbeek (BE); Barbara Rochus, Dilsen-Stokkem (BE); Jeroen Drijkoningen, Bilzen (BE); Stijn Henri J. Tomsin, Riemst (BE); Lucas Andreas Gabriel Ghekiere, Houthalen (BE); Alexander Jeroen E. Coppieters, Nieuwerkerken (BE); Wout Bert K. Van De Broek, Hamont-Achel (BE)

(73) Assignee: POLYVISION, naamloze vennootschap, Genk (BE)

( * ) Notice: Subject to any disclaimer, the term of this patent is extended or adjusted under 35 U.S.C. 154(b) by 791 days.

(21) Appl. No.: 17/629,200

(22) PCT Filed: Jul. 16, 2020

(86) PCT No.: PCT/IB2020/056685
§ 371 (c)(1),
(2) Date: Jan. 21, 2022

(87) PCT Pub. No.: WO2021/014289
PCT Pub. Date: Jan. 28, 2021

(65) Prior Publication Data

US 2022/0297470 A1 Sep. 22, 2022

(30) Foreign Application Priority Data

Jul. 23, 2019 (BE) .................................. 2019/5480

(51) Int. Cl.
*B43L 21/04* (2006.01)
*A45C 11/34* (2006.01)
(Continued)

(52) U.S. Cl.
CPC .............. *B43L 21/04* (2013.01); *A45C 11/34* (2013.01); *B43L 19/0062* (2013.01); *B43L 1/008* (2013.01)

(58) Field of Classification Search
None
See application file for complete search history.

(56) References Cited

U.S. PATENT DOCUMENTS 1,819,225 A * 8/1931 Burman ............... B43K 23/001 122/451 S
9,969,208 B1 * 5/2018 Hall ........................ B43L 1/008
(Continued)

FOREIGN PATENT DOCUMENTS

CN 208646452 U 3/2019
DE 202009016916 U1 6/2010
(Continued)

OTHER PUBLICATIONS

International Search Report & Written Opinion to corresponding PCT Application No. PCT/IB2020/056685 dated Nov. 3, 2020.

*Primary Examiner* — James B Hull
(74) *Attorney, Agent, or Firm* — Dinsmore & Shohl LLP

(57) ABSTRACT

A holder for utilities, for a metal whiteboard, includes a cover plate, which on a side hidden when in use, is provided with one or more supports, at least one of the free ends of which is provided with a magnet to be able to place the holder in a desired position on the whiteboard and whereby the cover plate on the same side hidden when in use, is provided with a brush with bristles made of an elastic polymer, said bristles being oriented with the bristle tops diagonally or perpendicularly to the surface of the white-board, whereby the edge of the cover plate shows a recess, the shape of which is complementary to the shape of a board eraser that can be positioned against the recess.

15 Claims, 3 Drawing Sheets

(51) Int. Cl.

| | |
|---|---|
| ***B43L 19/00*** | (2006.01) |
| *B43L 1/00* | (2006.01) |

(56) References Cited

U.S. PATENT DOCUMENTS

| | | | | |
|---|---|---|---|---|
| 10,299,556 | B1 * | 5/2019 | Reyes | F16B 1/00 |
| 2007/0044263 | A1 | 3/2007 | Deng | |
| 2008/0166173 | A1 | 7/2008 | Gibbons | |

FOREIGN PATENT DOCUMENTS

| | | | |
|---|---|---|---|
| JP | S47-37980 | B | 9/1972 |
| JP | H05-16879 | B | 3/1993 |

* cited by examiner

UTILITY HOLDER FOR A METAL WHITEBOARD

CROSS-REFERENCE TO RELATED APPLICATIONS

The present application is the National Phase entry of International Patent Application No. PCT/IB2020/056685 filed Jul. 16, 2020, which claims priority to Belgium Patent Application No. 2019/5480 filed Jul. 23, 2019, the entire contents of both are hereby incorporated by reference into this application.

TECHNICAL FIELD

The present disclosure relates to a utility holder for a whiteboard.

In particular, the present disclosure is intended to hold utilities used for a metal whiteboard in place.

BACKGROUND

It is known that whiteboards used in meeting rooms and classrooms often consist of enameled steel. The white enamel layer lends itself to writing on with, for example, felt-tip pens in different colours, after which the board can be wiped off again with a suitable eraser and used again for the next explanation.

Traditionally, these enameled metal boards are surrounded by a frame to hang them on a wall and they are also provided with a ledge below the board on which utilities can be put, such as writing utensils, erasers, sponges or magnetic disks to attach messages to the board.

A disadvantage of such a ledge is that it also collects all the dust and erased material that falls off the board, such that the ledge easily gets dirty, as do the utilities on the ledge.

Another disadvantage is that usually the ledge is narrow and unsuitable to store a plurality of utilities, such that the ledge sometimes takes the form of a trough in which the utilities end up in a messy tray, whereby a tidy overview of the available utilities is lacking.

U.S. Pat. No. 9,969,208 B1 describes a utility holder magnetically hung on a metal whiteboard. The holder comprises an open interior delimited by a base which connects the front wall, the rear wall and the side walls to each other. The holder shows vertical cylindrical tubes of the same height and depth as a central box-shaped chamber to which they are attached, said chamber being magnetically attached with its rear side to the whiteboard.

At their bottom end the cylindrical tubes are at least partially tapered, such that when a marker is slid in, they hold the cap of the marker when the marker is withdrawn from the tube. This clamping operation is restricted to markers with a diameter fitting for the cylindrical tubes.

U.S. Pat. No. 1,819,225 A describes a penholder with an open top, consisting of a front wall and a rear wall, connected to each other at the upstanding ends by curved side walls, and at the bottom by a closed base.

Both the described utility holder and the described penholder show the disadvantage that they do not provide a recess, the shape of which is complementary to the shape of an associated board eraser that after use can be glided against the complementary recess so as to keep the board wiper in a fixed position in the holder until a next use.

SUMMARY

The purpose of the present disclosure is to provide a solution to the aforementioned and other disadvantages, by providing a holder which allows the utilities to be stored in an orderly manner and at every desired chosen location on a metal whiteboard and allows an associated board eraser to be kept in a fixed position in the holder until a next use.

To this end, the present disclosure relates to a utility holder for a metal whiteboard whereby the holder comprises a cover plate, which on a side hidden when in use, is provided with one or more supports, at least one of the free ends of which is provided with a magnet to be able to place the holder in a desired position on the whiteboard and whereby the cover plate, on the same side hidden when in use, is provided with a brush with bristles made of an elastic polymer, said bristles being oriented with the bristle tops diagonally or perpendicularly to the surface of the whiteboard, and whereby the edge of the cover plate shows a recess, the shape of which is complementary to the shape of an associated board eraser that after use can be glided against the complementary recess so as to keep the board wiper in a fixed position in the holder until a next use.

In some embodiments, the holder comprises a rectangular cover plate supported by two walls under the short sides of the cover plate and by a closed rear wall under one long side of the cover plate, but whereby a front wall is missing under the other long side and whereby two magnets are positioned under the two walls of the rectangular cover plate to hold the holder in a desired position on the whiteboard.

The bristles of the brush are made from an elastic polymer, such as rubber, and show a slant relative to the cover plate, said slant orienting the bristles to the sliding direction to facilitate sliding in utilities, making it slightly more difficult however for utilities to be taken out or to fall out. An advantage of such position of the bristles is that sliding in utilities goes very efficiently, but once the utility is held in place it will no longer fall out of the holder until a person deliberately and with a certain force wants to withdraw an object from the holder.

In some embodiments, the bristles of the brush are embedded in rows of bristles, which run diagonally relative to the sides of the rectangular cover plate. An advantage of such embedding is that when an object is inserted perpendicularly behind the open edge of the holder, said object will be held in place by several non-aligned bristles, such that the object is grasped faster and better by the bristles.

The magnets on the two walls under the short sides of the rectangular cover plate keep the whole length of the rectangular cover plate stuck against the whiteboard and this in every desired orientation: vertically, horizontally or diagonally, depending on the user's preference or the available space on the metal whiteboard.

In some embodiments, the edge of the cover plate shows a recess, the form of which is complementary to the form of a board eraser which can be positioned against the recess.

An advantage of such a recess is that it is very intuitive for the user and prompts the user to position the board eraser in this recess after use.

The recess on the edge of the cover plate can take every form, complementary to a used board eraser, but, in some embodiments, may take the form of a circular segment and the board eraser, which is complementary to the recessed circular segment, is itself circular.

The recess, the form of which is complementary to the form of the board eraser, can be provided with a bumper made from an elastic polymer which follows the edge of the recess to prevent that the metal housing of the board eraser and the metal cover plate can damage each other when placing a metallic board eraser in the holder.

In some embodiments, such a circular board eraser may include a cylindrical holder for an eraser cloth and an eraser cloth which is clamped in the cylindrical holder by a clamping ring. In some embodiments, the cylindrical holder may include a circular upper part which can be slid in a complementary lower part and a clamping ring which can be placed around the lower part, whereby the lower part is clicked to the upper part by at least one spring closure and whereby the lower part is provided with a compressible ring made from a plastic foam or another elastic material around which an eraser cloth can be placed which is clamped by the loose ring and is also provided with a circular magnet, with which the cylindrical holder can be held in every desired position of the metal whiteboard.

An advantage of such a structure is that it allows the eraser cloth to be efficiently replaced by a new eraser cloth and the used eraser cloth to be washed for example, such that the eraser cloth can be renewed when saturated.

The circular upper part is provided with a central hollow cylinder with which pressure can be exercised on the compressible ring made from a plastic foam and the underlying eraser cloth.

In some embodiments, the eraser cloth is a microfiber cloth.

The utility that is held in place in the holder may include writing materials such as felt-tip pens, pencils or markers and a board eraser.

BRIEF DESCRIPTION OF THE DRAWINGS

With the intention of better showing the characteristics of the present disclosure, an embodiment of a utility holder for a whiteboard according to the present disclosure is described hereinafter, by way of an example without any limiting nature, with reference to the accompanying drawings wherein.

DETAILED DESCRIPTION

Figure 1:
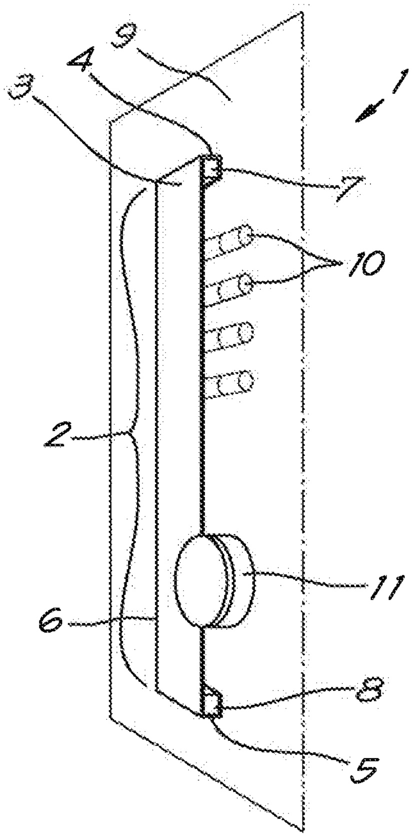
FIG. 1 schematically shows a perspective view of a utility holder according to the present disclosure.

FIG. 1 shows a perspective view of a holder 2 with utilities for a whiteboard. The holder 2 according to the present disclosure comprises a rectangular housing, includes a cover plate 3 supported by two walls 4, 5 under the short sides of the cover plate 3 and by a closed rear wall 6 under one long side of the cover plate, but whereby a front wall on the other long side is missing. The housing is provided with magnets 7, 8 against the two walls 4, 5 to hold the holder 2 in a desired position, in this case a vertical position, on a metal whiteboard 9. The utilities includes felt-tip pens 10 and a board eraser 11.

Figure 2:
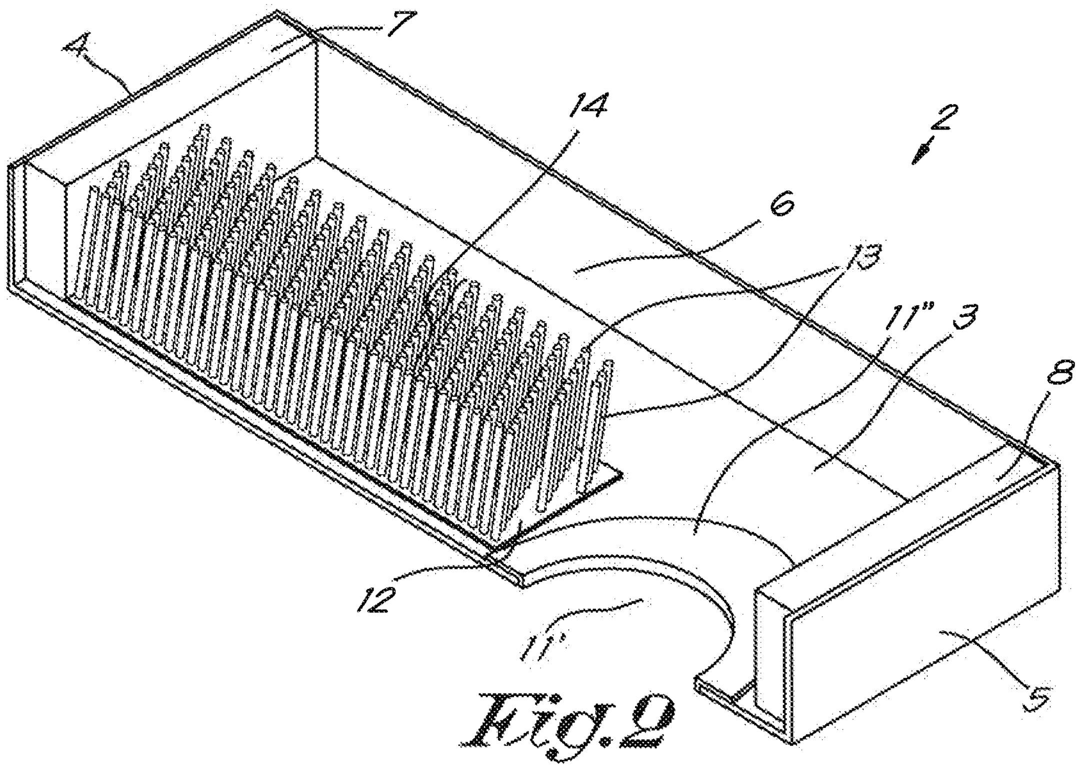
FIG. 2 shows a bottom view of FIG. 1 without utilities.

FIG. 2 shows a perspective view of the underside of the holder 2 for utilities of FIG. 1. The holder 2 is provided with a brush 12 with bristles 13 made from an elastic polymer, said brush 12 being fixed at the bottom of the cover plate 3 and the bristles of which are oriented with the bristle tops toward the surface of the whiteboard 9 and can show a slant relative to the cover plate 3, said slant orienting the bristles to the closed rear wall 6 under the housing and said bristles being embedded in rows 14 which run diagonally relative to the sides of the rectangular cover plate 3 of the housing. In this case the cover plate 3 is provided with a circular segment-shaped recess 11' for placing a circular board eraser 11, said recess being protected by a circular segment-shaped bumper 11" in rubber.

Figure 3:
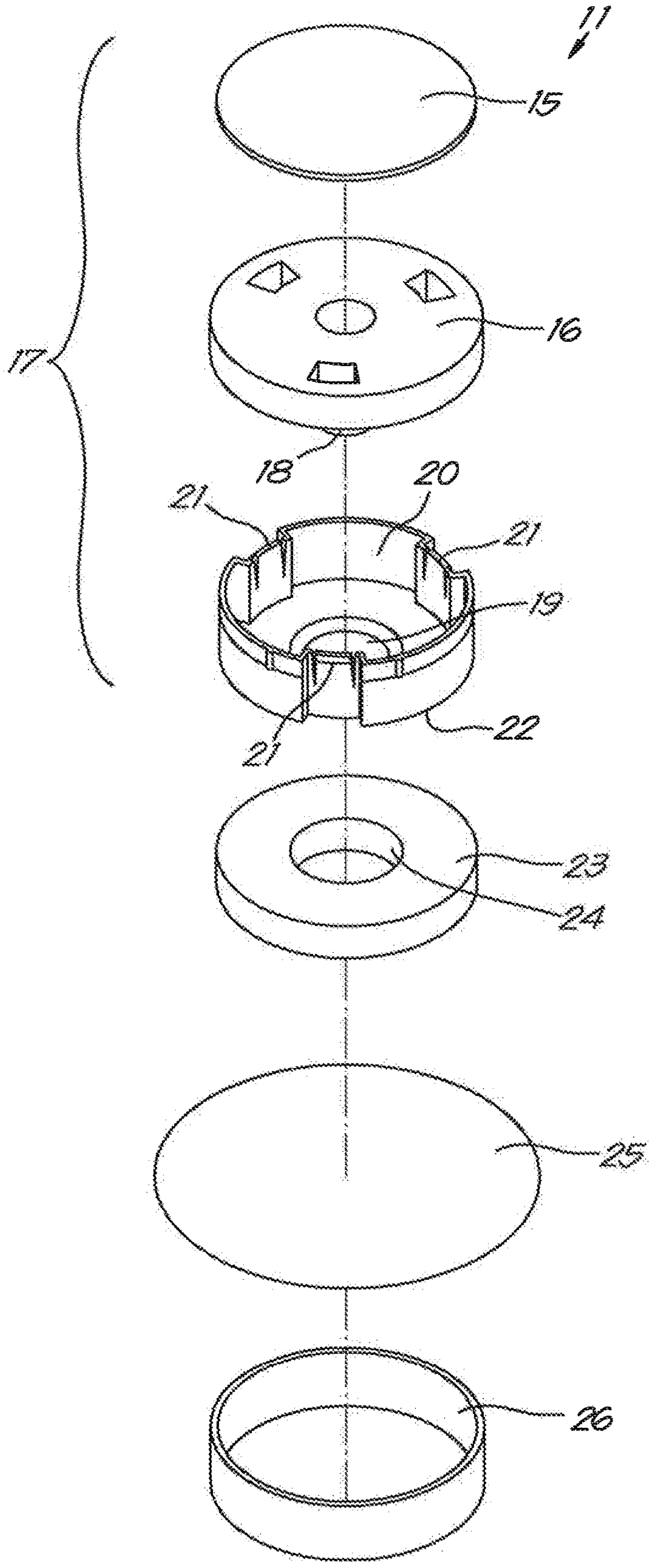
FIG. 3 shows an exploded view of a board eraser according to the present disclosure.

FIG. 3 shows an exploded view of the constituent components of a board eraser 11 according to the present disclosure, which includes a top disk 15, which fits on the upper part 16 of a circular handle 17, said upper part being provided with a central cylindrical protrusion 18 which is intended to hold a circular magnetic plate 19 in a lower part 20, which lower part 20 can be clicked to the upper part 16 by spring hooks 21 on the lower part 20 which engage an edge of the upper part 16.

A cylindrical recess 22 is provided on the underside of the lower part 20, in which an elastic disk 23 with a central recess 24 of a compressible material such as plastic foam can be positioned. Around the outside of the elastic disk 23 an eraser cloth 25, such as a microfiber cloth, can be wound, such that the underside and the outer contour of the elastic disk 23 are covered with the eraser cloth 25. The eraser cloth 25 is tensioned and kept in place by a clamping ring 26 which is slid upward along the underside over the lower part 20 and which causes the eraser cloth 25 to be clamped between the lower part 20 and the clamping ring 26, said clamping ring 26 engaging behind a protrusion in the lower part 20 to keep the clamping ring 26 in the desired position.

Figure 4:
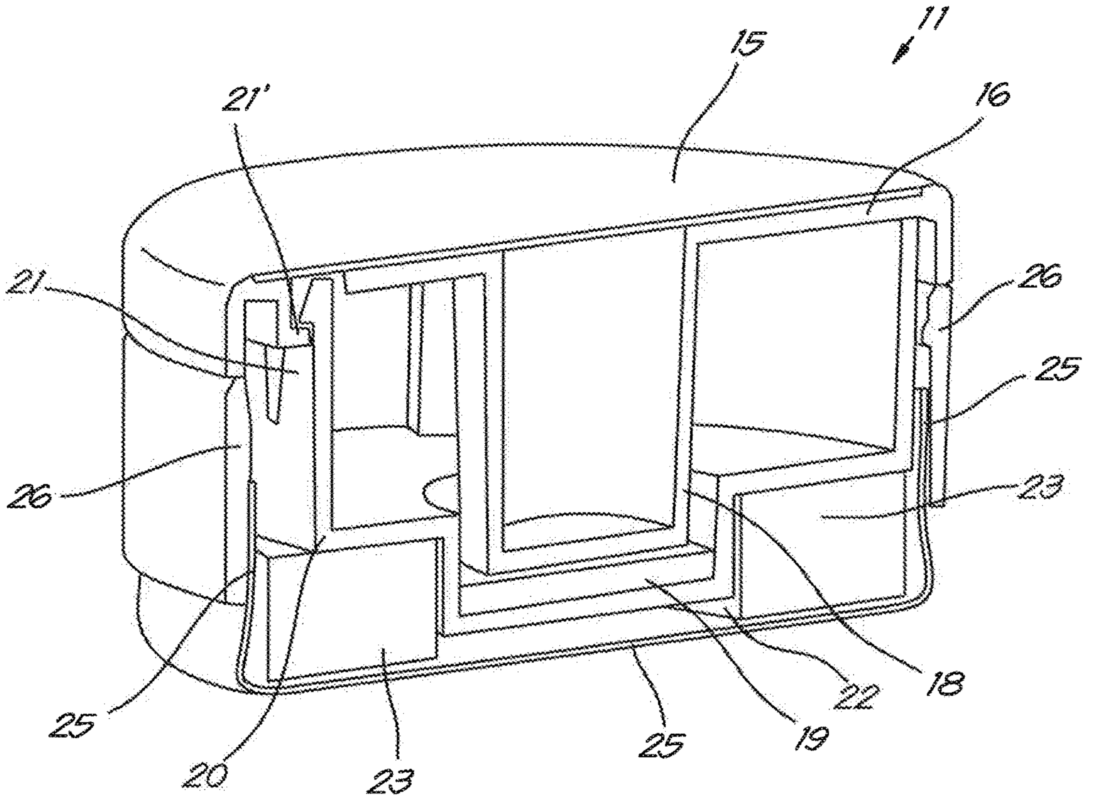
FIG. 4 shows a perspective view of a vertical cross-section of a composed board eraser according to the present disclosure.

FIG. 4 shows a perspective view of a cutaway vertical cross-section through the middle of an assembled board eraser 11 according to the present disclosure.

The upper part 16, provided with a top disk 15, holds the circular magnetic plate 19 at the bottom of the lower part in place with its central cylindrical protrusion 18, whereby the lower part 20 is clicked to the upper part 16 by three spring hooks 21 on the lower part 20 which engage an edge 21' of the upper part 16.

The elastic disk 23 from a compressible material is positioned in the cylindrical recess 22, provided on the underside of the lower part 20, and is held in place by the eraser cloth 25 which is folded around the outside of the elastic disk 23, whereby the eraser cloth 25 is in turn kept in place by the clamping ring 26 which engages behind an edge of the lower part 20 with a tooth.

The operation of the holder 2 for utilities for a whiteboard is very simple and as follows.

At the start of an explanation or lesson at the whiteboard 9 a user can slide the holder 2 to a desired position on the whiteboard 9. For a right-handed person this can be a position on the right-hand side of the board for example, vertically or horizontally or diagonally depending on their choice, whereas a left-handed person will use a position on the left-hand side of the board for example.

As soon as the user wants to write on the whiteboard 9, he can choose a suitable writing instrument, for example a felt-tip pen 10 of the desired colour, from the holder 2 by withdrawing the desired felt-tip pen from the holder. At any time he can put away the writing instrument 10 again by sliding it back into the holder 2, whereby the slantingly and diagonally positioned bristles 13 under the cover plate 3 of the holder 2 will grasp the writing instrument quickly and hold it in place for the next time it is used.

If the characters on the board need wiping, the user will intuitively find the board eraser 11 on the holder 2 which is magnetically held against the surface of the board by a magnet 19 in the underside of the board eraser 11 and when not in use can be positioned in the, in this case circular segment-shaped, recess 11' in the cover plate of the holder which is complementary to the cylindrical board eraser 11 that fits herein. In this case the recess is protected by an elastic bumper 11" which prevents damage to the metal cover plate and/or the board eraser 11.

The user will intuitively make circular movements with the board eraser 11 over the surface of the metal whiteboard 9 until the ink on the whiteboard is absorbed in the eraser cloth 25 that he presses against the whiteboard 9 with the board eraser 11. The board eraser 11 can be reused until the eraser cloth 25 is saturated and must be replaced by a new or washed eraser cloth.

The user can take apart the eraser by manually pulling the upper part 16 off the clamping ring 26, whereby the eraser cloth 25 is released and can be removed and replaced by a new or washed one and via a reverse action can be clamped on again.

The holder 2 allows a good overview of the available utilities 10 at all times, i.e. felt-tip pens or other writing material in for example several colours, with which a desired image can be made.

Two magnets 7, 8 on the ends of the cover plate 3 of the holder 2 keep the holder pressed against the surface of the metal whiteboard 9 at all times.

Obviously, variants of the embodiment as specified in the figures are also possible.

Thus the form of the board eraser 11 can also take variant forms instead of circular: oval, square or polygonal and be provided with a handle. In some embodiments, the variant is a circular eraser because it is intuitively used by the user in a rotating motion, whereby the eraser operation is optimal.

Thus, not only the recess 11' for the board eraser but also the entire length of the cover plate can be provided with an elastic bumper 11" to prevent damage of the cover plate 3.

The present disclosure is by not limited to the embodiments described as an example and shown in the figures, but a holder 2 for utilities of a whiteboard 9 according to the present disclosure can be realised in all kinds of forms and dimensions without departing from the scope of the present disclosure, as is described in the following claims.

The invention claimed is:

1. A holder for utilities for a metal whiteboard, the holder comprises a cover plate, which on a side hidden when in use, is provided with one or more supports, at least one of the free ends of which is provided with a magnet to be able to place the holder in a desired position on the whiteboard and the cover plate on the same side hidden when in use, is provided with a brush with bristles made of an elastic polymer, the bristles being oriented with bristle tops diagonally or perpendicularly to a surface of the whiteboard, and an edge of the cover plate shows a recess, a shape of which is complementary to a shape of an associated board eraser that after use can be glided against the complementary recess so as to keep the board eraser in a fixed position in the holder until a next use.

2. The holder according to claim 1, wherein the cover plate is a rectangular cover plate, supported by two walls under short sides of the cover plate and by a closed rear wall under one long side of the cover plate, but whereby a front wall on the other long side is missing and whereby two magnets to hold in place the holder in a desired position on the whiteboard are positioned under the two walls of the rectangular cover plate.

3. The holder according to claim 1, wherein the elastic polymer is rubber.

4. The holder according to claim 1, wherein the bristles of the brush show a slant relative to the cover plate, the slant orienting the bristles to a sliding in direction under a housing, which slant facilitates a sliding in of utilities, but counteracts a removal or falling out of utilities against the sliding in direction by a clamping action of a hairs manufactured from a resilient polymer.

5. The holder according to claim 2, wherein the bristles of the brush are embedded in rows of bristles, which run diagonally relative to the sides of the rectangular cover plate.

6. The holder according to claim 1, wherein the board eraser which is complementary to the recess in the form of a circular segment, is itself circular.

7. The holder according to claim 1, wherein the recess, the form of which is complementary to the form of the board eraser, is provided with a bumper made from an elastic polymer which follows a edge of the recess, which elastic polymer prevents that metal components of the board eraser could damage the metal cover plate when placing a metallic board eraser in the holder because the elastic polymer absorbs the impact of the board eraser on the metal cover plate.

8. The holder according to claim 7, wherein the circular board eraser includes an eraser cloth and a cylindrical holder for the eraser cloth, the eraser cloth is clamped in the cylindrical holder by a clamping ring.

9. The holder according to claim 8, wherein the cylindrical holder includes a circular upper part which can be slid into a complementary lower part and the clamping ring which can be placed around the lower part whereby the lower part is clicked to the upper part by at least one spring closure and whereby the lower part is provided with a compressible ring made from plastic foam or another elastic material around which the eraser cloth can be placed that is clamped by the clamping ring and is also provided with a circular magnet, with which the cylindrical holder and the circular board eraser can be held in place in every desired position of the metal whiteboard.

10. The holder according to claim 9, wherein the circular upper part is provided with a central hollow cylinder, with which pressure can be exercised on the compressible ring from a plastic foam and the underlying eraser cloth.

11. The holder according to claim 8, wherein the eraser cloth is a microfiber cloth.

12. The holder according to claim 4, wherein the utilities held in the holder include writing materials and the board eraser.

13. The holder according to claim 12, wherein the writing materials include at least one of felt-tip pens, pencils and markers.

14. The holder according to claim 9, wherein the eraser cloth is a microfiber cloth.

15. The holder according to claim 10, wherein the eraser cloth is a microfiber cloth.

* * * * *